(12) United States Patent
Arumugam et al.

(10) Patent No.: US 11,902,176 B2
(45) Date of Patent: Feb. 13, 2024

(54) SYSTEM FOR DETECTING MULTI-DIMENSIONAL LINKAGE AND LAYERING OF RESOURCE TRANSFERS USING A DISTRIBUTED SERVER NETWORK

(71) Applicant: BANK OF AMERICA CORPORATION, Charlotte, NC (US)

(72) Inventors: Rajalakshmi Arumugam, Tamil Nadu (IN); Mahesh Ganesan, Tamil Nadu (IN); Sreenivas Chintada, Tamil Nadu (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 16 days.

(21) Appl. No.: 17/679,486

(22) Filed: Feb. 24, 2022

(65) Prior Publication Data
US 2023/0269195 A1   Aug. 24, 2023

(51) Int. Cl.
| | |
|---|---|
| *H04L 47/762* | (2022.01) |
| *H04L 47/78* | (2022.01) |
| *H04L 43/065* | (2022.01) |
| *H04L 9/40* | (2022.01) |
| *G06N 20/00* | (2019.01) |
| *H04L 47/80* | (2022.01) |

(52) U.S. Cl.
CPC .......... *H04L 47/762* (2013.01); *G06N 20/00* (2019.01); *H04L 43/065* (2013.01); *H04L 47/781* (2013.01); *H04L 47/808* (2013.01); *H04L 63/102* (2013.01)

(58) Field of Classification Search
CPC ... H04L 43/065; H04L 47/762; H04L 47/781; H04L 47/808; H04L 63/102
See application file for complete search history.

(56) References Cited

U.S. PATENT DOCUMENTS

| | | |
|---|---|---|
| 7,805,377 B2 | 9/2010 | Felsher |
| 8,185,651 B2 | 5/2012 | Moran et al. |
| 8,194,646 B2 | 6/2012 | Elliott et al. |
| 8,543,665 B2 | 9/2013 | Ansari et al. |
| 9,479,587 B2 | 10/2016 | Bestler et al. |
| 9,712,289 B2 | 7/2017 | Jorgensen |
| 9,734,169 B2 | 8/2017 | Redlich et al. |
| 9,747,319 B2 | 8/2017 | Bestler et al. |
| 10,163,158 B2 | 12/2018 | Song et al. |

(Continued)

*Primary Examiner* — Thomas J Dailey
(74) *Attorney, Agent, or Firm* — Moore & Van Allen PLLC; Seongun M. Hong (57) ABSTRACT

A system is provided for detecting multi-dimensional linkage and layering of resource transfers using a distributed server network. In particular, the system may comprise a plurality of distributed server nodes that each host a copy of a distributed register, where each of the nodes may be operated by an entity. Each distributed server node may submit, to the distributed register, data records that may contain data regarding potential unauthorized users, accounts, and/or resource transfers. Based on the information within the distributed register, along with various other data inputs, the system may use a deep learning-based graph processing algorithm to identify a multi-dimensional linkage between the users, accounts, and/or resource transfers to extract hidden relationships and potentially unauthorized activity.

20 Claims, 4 Drawing Sheets

(56) References Cited

U.S. PATENT DOCUMENTS

| | | |
|---|---|---|
| 10,244,053 B2 | 3/2019 | Bestler et al. |
| 10,310,760 B1 | 6/2019 | Dreier et al. |
| 10,438,297 B2 | 10/2019 | Han et al. |
| 10,504,020 B2 | 12/2019 | Trenholm et al. |
| 10,607,227 B2 | 3/2020 | Venkatesh et al. |
| 10,628,828 B2 | 4/2020 | Caldera |
| 10,721,336 B2 | 7/2020 | Banerjee et al. |
| 10,733,116 B2 | 8/2020 | Litichever et al. |
| 10,922,754 B2 | 2/2021 | Song et al. |
| 10,929,854 B2 | 2/2021 | Rai et al. |
| 10,929,936 B1 | 2/2021 | Duranske |
| 10,938,817 B2 | 3/2021 | Han et al. |
| 11,128,045 B2 | 9/2021 | Tran et al. |
| 11,270,201 B2 | 3/2022 | Sridharan et al. |
| 2009/0319672 A1 | 12/2009 | Reisman |
| 2016/0182416 A1 | 6/2016 | Rathod |
| 2017/0063909 A1 | 3/2017 | Muddu et al. |
| 2018/0322606 A1 | 11/2018 | Das et al. |
| 2019/0312869 A1* | 10/2019 | Han ................. G06F 21/64 |
| 2019/0319861 A1* | 10/2019 | Pan .................. H04L 9/0637 |
| 2019/0386969 A1 | 12/2019 | Verzun et al. |
| 2020/0167763 A1* | 5/2020 | Robins ............... G06Q 20/065 |
| 2020/0178198 A1 | 6/2020 | Ding et al. |
| 2020/0195495 A1 | 6/2020 | Parker et al. |
| 2020/0258263 A1 | 8/2020 | Ray et al. |
| 2020/0372154 A1* | 11/2020 | Bacher ............... H04L 41/145 |
| 2021/0182859 A1* | 6/2021 | Srinivasa Rao ... G06Q 20/4016 |
| 2021/0209603 A1* | 7/2021 | Panicker ........... G06Q 20/4016 |
| 2022/0417272 A1* | 12/2022 | Grover .............. G06N 20/00 |

\* cited by examiner

┌─────────────────────────────────────────────────────────────┐
│ RETRIEVE A SET OF RESOURCE TRANSFER DATA FROM A DISTRIBUTED │
│ REGISTER, WHEREIN THE SET OF RESOURCE TRANSFER DATA COMPRISES│
│ DATA SUBMITTED BY ONE OR MORE ENTITIES REGARDING ONE OR MORE│
│ POTENTIALLY UNAUTHORIZED USERS, ACCOUNTS, AND RESOURCE TRANSFERS│
│                             401                              │
└─────────────────────────────────────────────────────────────┘
                              │
                              ▼
┌─────────────────────────────────────────────────────────────┐
│ BASED ON THE SET OF RESOURCE TRANSFER DATA, EXECUTE A DEEP  │
│ LEARNING-BASED MACHINE LEARNING ALGORITHM TO IDENTIFY MULTI-│
│ DIMENSIONAL LINKAGES BETWEEN THE POTENTIALLY UNAUTHORIZED USERS,│
│           ACCOUNTS, AND RESOURCE TRANSFERS                   │
│                             402                              │
└─────────────────────────────────────────────────────────────┘
                              │
                              ▼
┌─────────────────────────────────────────────────────────────┐
│ EXECUTE TIME SERIES BASED TRACKING OF THE POTENTIALLY UNAUTHORIZED│
│              USERS, ACCOUNTS, AND RESOURCE TRANSFERS         │
│                             403                              │
└─────────────────────────────────────────────────────────────┘
                              │
                              ▼
┌─────────────────────────────────────────────────────────────┐
│ IDENTIFY, WITHIN THE SET OF RESOURCE TRANSFER DATA, ONE OR MORE│
│ LAYERING PATTERNS ASSOCIATED WITH A CONVERSION OF RESOURCES FROM│
│              A FIRST FORMAT TO A SECOND FORMAT               │
│                             404                              │
└─────────────────────────────────────────────────────────────┘
                              │
                              ▼
┌─────────────────────────────────────────────────────────────┐
│ IDENTIFY ONE OR MORE SOURCE AGENTS, ONE OR MORE LAYERING AGENTS,│
│     AND ONE OR MORE DESTINATION AGENTS FROM THE ONE OR MORE  │
│ POTENTIALLY UNAUTHORIZED USERS, ACCOUNTS, AND RESOURCE TRANSFERS│
│                             405                              │
└─────────────────────────────────────────────────────────────┘
```

FIG. 4

SYSTEM FOR DETECTING MULTI-DIMENSIONAL LINKAGE AND LAYERING OF RESOURCE TRANSFERS USING A DISTRIBUTED SERVER NETWORK

FIELD OF THE INVENTION

The present disclosure embraces a system for detecting multi-dimensional linkage and layering of resource transfers using a distributed server network.

BACKGROUND

There is a need for a secure and efficient way to detect unauthorized resource transfers and/or entities.

BRIEF SUMMARY

The following presents a simplified summary of one or more embodiments of the invention in order to provide a basic understanding of such embodiments. This summary is not an extensive overview of all contemplated embodiments and is intended to neither identify key or critical elements of all embodiments, nor delineate the scope of any or all embodiments. Its sole purpose is to present some concepts of one or more embodiments in a simplified form as a prelude to the more detailed description that is presented later.

A system is provided for detecting multi-dimensional linkage and layering of resource transfers using a distributed server network. In particular, the system may comprise a plurality of distributed server nodes that each host a copy of a distributed register, where each of the nodes may be operated by an entity. Each distributed server node may submit, to the distributed register, data records that may contain data regarding potential unauthorized users, accounts, and/or resource transfers. Based on the information within the distributed register, along with various other data inputs, the system may use a deep learning-based graph processing algorithm to identify a multi-dimensional linkage between the users, accounts, and/or resource transfers to extract hidden relationships and potentially unauthorized activity.

Accordingly, embodiments of the present disclosure provide a system for detecting multi-dimensional linkage and layering of resource transfers using a distributed server network, the system comprising a memory device with computer-readable program code stored thereon; a communication device; and a processing device operatively coupled to the memory device and the communication device, wherein the processing device is configured to execute the computer-readable program code to retrieve a set of resource transfer data from a distributed register, wherein the set of resource transfer data comprises data submitted by one or more entities regarding one or more potentially unauthorized users, accounts, and resource transfers; based on the set of resource transfer data, execute a deep learning-based machine learning algorithm to identify multi-dimensional linkages between the potentially unauthorized users, accounts, and resource transfers; execute time series based tracking of the potentially unauthorized users, accounts, and resource transfers; identify, within the set of resource transfer data, one or more layering patterns associated with a conversion of resources from a first format to a second format; and identify one or more source agents, one or more layering agents, and one or more destination agents from the one or more potentially unauthorized users, accounts, and resource transfers.

In some embodiments, executing the time series based tracking comprises generating data linkages between data points in the set of resource transfer data to identify a frequency and a time period for the one or more potentially unauthorized users, accounts, and resource transfers; and based on the frequency and the time period, execute, using the deep learning-based machine learning algorithm, time-based pattern recognition on the one or more potentially unauthorized users, accounts, and resource transfers.

In some embodiments, the set of resource transfer data further comprises geo-spatial data associated with the one or more potentially unauthorized users, accounts, and resource transfers, wherein identifying the multi-dimensional linkages further comprises generating data linkages between geographical regions associated with the one or more potentially unauthorized users, accounts, and resource transfers.

In some embodiments, the processing device is further configured to execute the computer-readable program code to generate a graph database, wherein the one or more source agents, the one or more layering agents, and the one or more destination agents are stored as vertices in the graph database, wherein one or more associations between the one or more source agents, the one or more layering agents, and the one or more destination agents are stored as relationships in the graph database.

In some embodiments, the deep learning-based machine learning algorithm uses bipartite graph processing.

In some embodiments, the processing device is further configured to execute the computer-readable program code to generate a report identifying the one or more source agents, the one or more layering agents, and the one or more destination agents; and transmit the report to a user computing system.

In some embodiments, the processing device is further configured to execute the computer-readable program code to identify a chain of resource transfers between the one or more source agents, the one or more layering agents, and the one or more destination agents, wherein the chain of resource transfers is identified to be an unauthorized resource transfer process.

Embodiments of the present disclosure also provide a computer program product for detecting multi-dimensional linkage and layering of resource transfers using a distributed server network, the computer program product comprising at least one non-transitory computer readable medium having computer-readable program code portions embodied therein, the computer-readable program code portions comprising executable portions for retrieving a set of resource transfer data from a distributed register, wherein the set of resource transfer data comprises data submitted by one or more entities regarding one or more potentially unauthorized users, accounts, and resource transfers; based on the set of resource transfer data, executing a deep learning-based machine learning algorithm to identify multi-dimensional linkages between the potentially unauthorized users, accounts, and resource transfers; executing time series based tracking of the potentially unauthorized users, accounts, and resource transfers; identifying, within the set of resource transfer data, one or more layering patterns associated with a conversion of resources from a first format to a second format; and identifying one or more source agents, one or more layering agents, and one or more destination agents from the one or more potentially unauthorized users, accounts, and resource transfers.

In some embodiments, executing the time series based tracking comprises generating data linkages between data points in the set of resource transfer data to identify a frequency and a time period for the one or more potentially unauthorized users, accounts, and resource transfers; and based on the frequency and the time period, execute, using the deep learning-based machine learning algorithm, time-based pattern recognition on the one or more potentially unauthorized users, accounts, and resource transfers.

In some embodiments, the set of resource transfer data further comprises geo-spatial data associated with the one or more potentially unauthorized users, accounts, and resource transfers, wherein identifying the multi-dimensional linkages further comprises generating data linkages between geographical regions associated with the one or more potentially unauthorized users, accounts, and resource transfers.

In some embodiments, the computer-readable program code portions further comprise executable portions for generating a graph database, wherein the one or more source agents, the one or more layering agents, and the one or more destination agents are stored as vertices in the graph database, wherein one or more associations between the one or more source agents, the one or more layering agents, and the one or more destination agents are stored as relationships in the graph database.

In some embodiments, the deep learning-based machine learning algorithm uses bipartite graph processing.

In some embodiments, the computer-readable program code portions further comprise executable portions for generating a report identifying the one or more source agents, the one or more layering agents, and the one or more destination agents; and transmitting the report to a user computing system.

Embodiments of the present disclosure also provide a computer-implemented method for detecting multi-dimensional linkage and layering of resource transfers using a distributed server network, the computer-implemented method comprising retrieving a set of resource transfer data from a distributed register, wherein the set of resource transfer data comprises data submitted by one or more entities regarding one or more potentially unauthorized users, accounts, and resource transfers; based on the set of resource transfer data, executing a deep learning-based machine learning algorithm to identify multi-dimensional linkages between the potentially unauthorized users, accounts, and resource transfers; executing time series based tracking of the potentially unauthorized users, accounts, and resource transfers; identifying, within the set of resource transfer data, one or more layering patterns associated with a conversion of resources from a first format to a second format; and identifying one or more source agents, one or more layering agents, and one or more destination agents from the one or more potentially unauthorized users, accounts, and resource transfers.

In some embodiments, executing the time series based tracking comprises generating data linkages between data points in the set of resource transfer data to identify a frequency and a time period for the one or more potentially unauthorized users, accounts, and resource transfers; and based on the frequency and the time period, execute, using the deep learning-based machine learning algorithm, time-based pattern recognition on the one or more potentially unauthorized users, accounts, and resource transfers.

In some embodiments, the set of resource transfer data further comprises geo-spatial data associated with the one or more potentially unauthorized users, accounts, and resource transfers, wherein identifying the multi-dimensional linkages further comprises generating data linkages between geographical regions associated with the one or more potentially unauthorized users, accounts, and resource transfers.

In some embodiments, the computer-implemented method further comprises generating a graph database, wherein the one or more source agents, the one or more layering agents, and the one or more destination agents are stored as vertices in the graph database, wherein one or more associations between the one or more source agents, the one or more layering agents, and the one or more destination agents are stored as relationships in the graph database.

In some embodiments, the deep learning-based machine learning algorithm uses bipartite graph processing.

In some embodiments, the computer-implemented method further comprises generating a report identifying the one or more source agents, the one or more layering agents, and the one or more destination agents; and transmitting the report to a user computing system.

In some embodiments, the computer-implemented method further comprises identifying a chain of resource transfers between the one or more source agents, the one or more layering agents, and the one or more destination agents, wherein the chain of resource transfers is identified to be an unauthorized resource transfer process.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

"Entity" as used herein may refer to an individual or an organization that owns and/or operates an online system of networked computing devices, systems, and/or peripheral devices on which the system described herein is implemented. The entity may be a business organization such as a financial institution, a non-profit organization, a government organization, and the like, which may routinely use various types of applications within its enterprise environment to accomplish its organizational objectives.

"The system" or "entity system" as used herein may refer to the computing systems, devices, software, applications, communications hardware, and/or other resources used by the entity to perform the functions as described herein. Accordingly, the entity system may comprise desktop computers, laptop computers, servers, Internet-of-Things ("IoT") devices, networked terminals, mobile smartphones, smart devices (e.g., smart watches), network connections, and/or other types of computing systems or devices and/or peripherals along with their associated applications.

"Computing system" or "computing device" as used herein may refer to a networked computing device within the entity system. The computing system may include a processor, a non-transitory storage medium, a communications device, and a display. The computing system may be configured to support user logins and inputs from any combination of similar or disparate devices. Accordingly, the computing system may be a portable electronic device such as a smartphone, tablet, single board computer, smart device, or laptop. In other embodiments, the computing system may be a stationary unit such as a personal desktop computer, networked terminal, IoT device, or the like.

"User" as used herein may refer to an individual who may interact with the entity system to access the functions therein. Accordingly, the user may be an agent, employee, associate, contractor, or other authorized party who may access, use, administrate, maintain, and/or manage the computing systems within the entity system. In other embodiments, the user may be a client or customer of the entity.

Accordingly, as used herein the term "user device" or "mobile device" may refer to mobile phones, personal computing devices, tablet computers, wearable devices, and/or any portable electronic device capable of receiving and/or storing data therein.

"Distributed register," which may also be referred to as a "distributed ledger," as used herein may refer to a structured list of data records that is decentralized and distributed amongst a plurality of computing systems and/or devices. In some embodiments, the distributed ledger may use a linked block structure.

"Linked block," "linked block structure," or "blockchain" as used herein may refer to a data structure which may comprise a series of sequentially linked "blocks," where each block may comprise data and metadata. The "data" within each block may comprise one or more "data record" or "transactions," while the "metadata" within each block may comprise information about the block, which may include a timestamp, a hash value of data records within the block, and a pointer (e.g., a hash value) to the previous block in the linked block structure. In this way, beginning from an originating block (e.g., a "genesis block"), each block in the linked block structure is linked to another block via the pointers within the block headers. If the data or metadata within a particular block in the linked block structure becomes corrupted or modified, the hash values found in the header of the affected block and/or the downstream blocks may become mismatched, thus allowing the system to detect that the data has been corrupted or modified.

A "linked block ledger" may refer to a distributed ledger which uses linked block data structures. Generally, a linked block ledger is an "append only" ledger in which the data within each block within the linked block ledger may not be modified after the block is added to the linked block ledger; data may only be added in a new block to the end of the linked block ledger. In this way, the linked block ledger may provide a practically immutable ledger of data records over time.

"Permissioned distributed register" as used herein may refer to a linked block ledger for which an access control mechanism is implemented such that only known, authorized users may take certain actions with respect to the linked block ledger (e.g., add new data records, participate in the consensus mechanism, or the like). Accordingly, "unpermissioned distributed ledger" as used herein may refer to a linked block ledger without an access control mechanism.

"Private distributed register" as used herein may refer to a linked block ledger accessible only to users or devices that meet specific criteria (e.g., authorized users or devices of a certain entity or other organization). Accordingly, a "public distributed ledger" is a linked block ledger accessible by any member or device in the public realm.

"Distributed register node" or "node" as used herein may refer to a computing system on which the distributed ledger is hosted. In some embodiments, each node maintains a full copy of the distributed ledger. In this way, even if one or more nodes become unavailable or offline, a full copy of the distributed ledger may still be accessed via the remaining nodes in the distributed ledger system. That said, in some embodiments, the nodes may host a hybrid distributed ledger such that certain nodes may store certain segments of the linked block ledger but not others. The disclosure provided herein may further contemplate the nodes of a graph stored in a graph database. In such scenarios, the term "graph node" will be used to describe such nodes.

"Consensus," "consensus algorithm," or "consensus mechanism" as used herein may refer to the process or processes by which nodes come to an agreement with respect to the contents of the distributed ledger. Changes to the ledger (e.g., addition of data records) may require consensus to be reached by the nodes in order to become a part of the authentic version of the ledger. In this way, the consensus mechanism may ensure that each node maintains a copy of the distributed ledger that is consistent with the copies of the distributed ledger hosted on the other nodes; if the copy of the distributed ledger hosted on one node becomes corrupted or compromised, the remaining nodes may use the consensus algorithm to determine the "true" version of the distributed ledger. The nodes may use various different mechanisms or algorithms to obtain consensus, such as proof-of-work ("PoW"), proof-of-stake ("PoS"), practical byzantine fault tolerance ("PBFT"), proof-of-authority ("PoA"), or the like.

"Resource" as used herein may refer to tangible or intangible objects which may be held, owned, or used by a user and/or the entity. In this regard, examples of such resources may include electronic data files, documents, computing devices and/or other types of electronic hardware, physical objects, funds, financial instruments, computing resources, or the like. In some embodiments, a resource may be associated with one or more accounts (e.g., a user account). Accordingly, "resource transfer" or "resource transfer process" as used herein may refer to a transfer of resources from a resource origin to a resource destination, such as a data transfer, provisioning of hardware, transaction (e.g., funds transfer), or the like.

The system as described herein may provide a way to use machine learning algorithms to detect unauthorized activity as well as the parties to the unauthorized activity. In this regard, the system may comprise a consortium of entities (e.g., financial institutions) that may each host one or more nodes of a distributed register. Each of the entities may submit, to the distributed register, data that has been generated as a result of one or more procedures or processes to detect unusual or unauthorized activity (e.g., anti-money laundering or "AML" processes). In this regard, the processes may identify certain users, accounts, and/or resource transfers as being potentially involved in the unauthorized activity. Accordingly, the shared data may include information such as transactions involving known unauthorized parties, transactions involving cryptocurrency exchanges, information on legal entities, sources of the resources, and the like.

Each entity may further share, to the distributed register, geo-spatial data regarding resource transfers processed by the entity. In this regard, the geo-spatial data may include geographic locations and/or jurisdictions associated with the source and/or destination for the resource transfer, which may further include the type and/or amount of resource transferred (e.g., the physical location at which the resources have been actually exchanged or retrieved). Finally, each entity may further submit data regarding any exchanges between cryptocurrencies and fiat currencies which may have been processed by the entity.

Based on the information described above, the system may use a deep graph neural artificial intelligence/machine learning ("AI/ML") process to identify multi-dimensional linkages between users, accounts, and resource transfers across geographical regions. In this regard, the system may be able to detect a series of resource transfers as being related to and/or an integral part of potentially unauthorized activity. The system may further perform time series based tracking of resource transfers and layering of relationships. In particular, the system may use a semi-supervised learning process to identify time-related patterns in tracking the unauthorized resource transfers. For instance, the system may identify that outgoing resource transfers originating from a certain geographic region may take place a certain timeframe after the incoming resource transfer (e.g., after 6 months). Finally, the system may identify patterns and linkages based on cryptocurrency vs. fiat currency conversions.

Based on the outcomes of the process, the system may identify the parties of the unauthorized resource transfers, which may include the source agents (e.g., the source of the illegitimate resources), layering agents (e.g., agents that may obfuscate the true sources or destinations of the resources), and destination agents (e.g., agents that may be the hidden beneficiaries of the resources). The identified parties may then be used to generate a graph to be stored in a graph database, in which the parties are stored as vertices and the associations or linkages are stored as relationships. In some embodiments, the system may further pull International Beneficiary Data from the Internet to serve as an additional input into the AI/ML process.

The system as described herein provides a number of advantages over existing technologies for detecting unauthorized activity. By accessing the data stored by the consortium of entities, the system may generate linkages and associations between entities in a way that may not be possible through manual methods by any single entity. Furthermore, by being able to detect such time-related patterns, the system may be able to identify relationships that may not be readily identifiable by ordinary measures.

Figure 1:
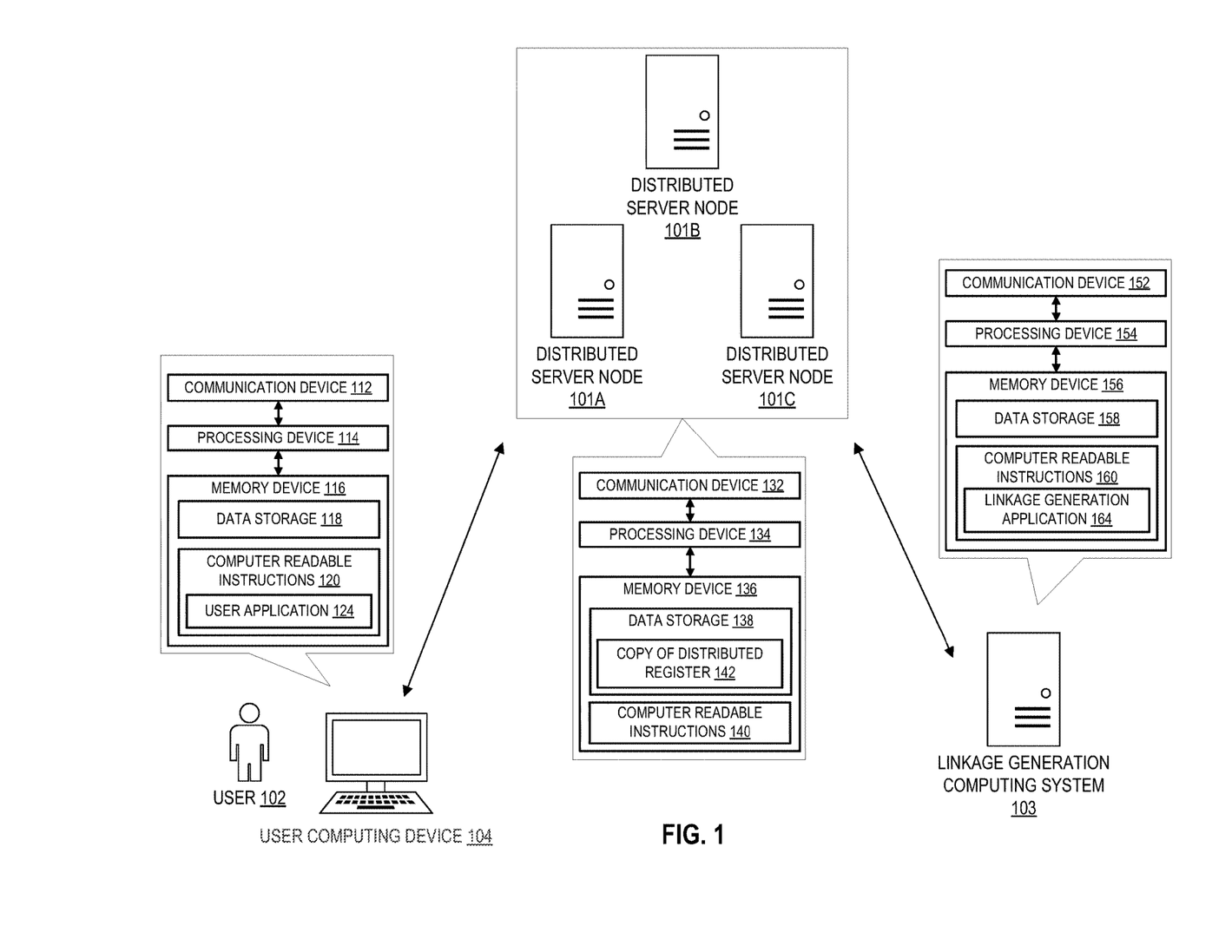
FIG. 1 illustrates an operating environment for the multi-dimensional linkage generation system, in accordance with one embodiment of the present disclosure.

Turning now to the figures, FIG. 1 illustrates an operating environment 100 for the multi-dimensional linkage generation system, in accordance with one embodiment of the present disclosure. In particular, FIG. 1 illustrates a linkage generation computing system 103 and a user computing device 104 in operative communication with a plurality of distributed server nodes 101A, 101B, 101C over a network. In such a configuration, the computing systems within the network, including the linkage generation computing system 103, the user computing device 104, and distributed server nodes 101A, 101B, 101C may transmit data to and/or receive data from one another through the network.

It should be understood that FIG. 1 illustrates only an exemplary embodiment of the operating environment 100, and it will be appreciated that the operating environment 100 may comprise fewer or greater numbers of computing systems than what is depicted in FIG. 1. For example, though FIG. 1 depicts three distributed server nodes 101A, 101B, 101C, the operating environment may comprise a greater or fewer number of distributed server nodes depending on the embodiment. It should also be appreciated that one or more functions of the systems, devices, or servers as depicted in FIG. 1 may be combined into a single system, device, or server and/or performed by other computing systems. Furthermore, the functions of a single system, device, or server as depicted in FIG. 1 may be distributed across multiple computing systems.

The network may be a system specific distributive network receiving and distributing specific network feeds and identifying specific network associated triggers. The network may include one or more cellular radio towers, antennae, cell sites, base stations, telephone networks, cloud networks, radio access networks (RAN), Wi-Fi networks, or the like. Additionally, the network may also include a global area network (GAN), such as the Internet, a wide area network (WAN), a local area network (LAN), or any other type of network or combination of networks. Accordingly, the network may provide for wireline, wireless, or a combination wireline and wireless communication between devices on the network.

As illustrated in FIG. 1, the distributed server nodes 101A, 101B, 101C may form a cluster of nodes that host a distributed register. Accordingly, the distributed server nodes 101A, 101B, 101C may each comprise a communication device 132, a processing device 134, and a memory device 136, where the processing device 134 is operatively coupled to the communication device 132 and the memory device 136. The processing device 134 uses the communication device 132 to communicate with the network and other devices on the network. As such, the communication device 132 generally comprises a modem, antennae, Wi-Fi or Ethernet adapter, radio transceiver, or other device for communicating with other devices on the network.

The memory device 136 comprises computer-readable instructions 140 and data storage 138, where the data storage 138 may comprise a copy of a distributed register 142. The distributed register (and the copy of the distributed register 142), as described elsewhere herein, may comprise a series of data records relevant to the objectives of an entity associated with the distributed server network. In this regard, the distributed server nodes 101A, 101B, 101C may be able to read data from the distributed register, submit data records to the distributed register, participate in consensus mechanisms, or the like. In particular, the copy of the distributed register 142 may comprise data submitted by one or more entities within a consortium, which may include data obtained through each entity's procedures and processes for detecting unauthorized or suspicious resource transfers.

As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The communication device 152, and other communication devices as described herein, may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the systems described herein may also include a communication interface device that may be connected by a hardwire connection to the resource distribution device. The interface device may comprise a connector such as a USB, SATA, PATA, SAS or other data connector for transmitting data to and from the respective computing system.

As illustrated in FIG. 1, the linkage generation computing system 103 may be an intelligent computing system that performs the AI/ML driven processes described herein. In this regard, the linkage generation computing system 103 may be a server that is communicatively coupled with the distributed server nodes 101A, 101B, 101C. Accordingly, the linkage generation computing system 103 may comprise a processing device 154 operatively coupled to a communication device 152 and a memory device 156. The memory device 156 may comprise data storage 158 and computer readable instructions 160 stored thereon, where the computer readable instructions 160 may comprise a linkage generation application 164.

The linkage generation application 164 may, when executed, cause the processing device 154 of the linkage generation computing system 103 to use deep learning-based algorithms to identify linkages between parties or entities and generate graphs that display the parties along with the relationships or associations between the parties. In this regard, the linkage generation computing system 103 may further cause the processing device 154 to display the graph (along with other types of information, such as geographic information, resource transfer data, and the like) to the user computing device 104.

As illustrated in FIG. 1, the user computing device 104 may be in operative communication with the distributed server nodes 101A, 101B, 101C. The user computing device 104 may be a device that may be operated by a user (e.g., the user 102, who may be an employee or agent of the entity). In particular, the user computing device 104 may be a computing device which may be used access the copy of the distributed register 142 stored on the distributed server nodes 101A, 101B, and 101C and/or communicate with the linkage generation computing system 103.

Accordingly, the user computing device 104 may comprise a communication device 112, a processing device 114, and a memory device 116. In some embodiments, the user computing device 104 may comprise hardware and/or software components that allow the user computing device 104 to interface with the user 102. In such embodiments, the user computing device 104 may comprise a user interface comprising one or more input devices (e.g., a keyboard, keypad, microphone, mouse, tracking device, biometric readers, capacitive sensors, or the like) and/or output devices (e.g., a display such as a monitor, projector, headset, touchscreen, and/or auditory output devices such as speakers, headphones, or the like).

The memory device 116 of the user computing device 104 may further comprise data storage 118 and computer-readable instructions 120 stored thereon, where the computer-readable instructions 120 may comprise a user application 124. The user application 124 may be a software application that allows the user 102 to access a portal to view information regarding linkages generated by the linkage generation computing system 103. Accordingly, in some embodiments, the user application 124 may be an application provided by the entity. In other embodiments, the user application 124 may be a third party application such as a web browser. The user application 124 may be used by the user 102 to view a visualization of the graph generated by the linkage generation computing system 103. In this way, the user 102 may be able to view information regarding the parties to unauthorized transactions (including "hidden" destinations of such transactions).

The communication devices as described herein may comprise a wireless local area network (WLAN) such as Wi-Fi based on the Institute of Electrical and Electronics Engineers' (IEEE) 802.11 standards, Bluetooth short-wavelength UHF radio waves in the ISM band from 2.4 to 2.485 GHz or other wireless access technology. Alternatively or in addition to the wireless interface, the distributed register node 103 may also include a communication interface device that may be connected by a hardwire connection to the resource distribution device. The interface device may comprise a connector such as a USB, SATA, PATA, SAS or other data connector for transmitting data to and from the respective computing system.

The computing systems described herein may each further include a processing device communicably coupled to devices as a memory device, output devices, input devices, a network interface, a power source, a clock or other timer, a camera, a positioning system device, a gyroscopic device, one or more chips, and the like.

In some embodiments, the computing systems may access one or more databases or datastores (not shown) to search for and/or retrieve information related to the service provided by the entity. The computing systems may also access a memory and/or datastore local to the various computing systems within the operating environment 100.

The processing devices as described herein may include functionality to operate one or more software programs or applications, which may be stored in the memory device. For example, a processing device may be capable of operating a connectivity program, such as a web browser application. In this way, the computing systems may transmit and receive web content, such as, for example, product valuation, service agreements, location-based content, and/or other web page content, according to a Wireless Application Protocol (WAP), Hypertext Transfer Protocol (HTTP), and/or the like.

A processing device may also be capable of operating applications. The applications may be downloaded from a server and stored in the memory device of the computing systems. Alternatively, the applications may be pre-installed and stored in a memory in a chip.

The chip may include the necessary circuitry to provide integration within the devices depicted herein. Generally, the chip will include data storage which may include data associated with the service that the computing systems may be communicably associated therewith. The chip and/or data storage may be an integrated circuit, a microprocessor, a system-on-a-chip, a microcontroller, or the like. In this way, the chip may include data storage. Of note, it will be apparent to those skilled in the art that the chip functionality may be incorporated within other elements in the devices. For instance, the functionality of the chip may be incorporated within the memory device and/or the processing device. In a particular embodiment, the functionality of the chip is incorporated in an element within the devices. Still further, the chip functionality may be included in a removable storage device such as an SD card or the like.

A processing device may be configured to use the network interface to communicate with one or more other devices on a network. In this regard, the network interface may include an antenna operatively coupled to a transmitter and a receiver (together a "transceiver"). The processing device may be configured to provide signals to and receive signals from the transmitter and receiver, respectively. The signals may include signaling information in accordance with the air interface standard of the applicable cellular system of the wireless telephone network that may be part of the network. In this regard, the computing systems may be configured to operate with one or more air interface standards, communication protocols, modulation types, and access types. By way of illustration, the devices may be configured to operate in accordance with any of a number of first, second, third, fourth, and/or fifth-generation communication protocols and/or the like. For example, the computing systems may be configured to operate in accordance with second-generation (2G) wireless communication protocols IS-136 (time division multiple access (TDMA)), GSM (global system for mobile communication), and/or IS-95 (code division multiple access (CDMA)), or with third-generation (3G) wireless communication protocols, such as Universal Mobile Telecommunications System (UMTS), CDMA2000, wideband CDMA (WCDMA) and/or time division-synchronous CDMA (TD-SCDMA), with fourth-generation (4G) wireless communication protocols, with fifth-generation (5G) wireless communication protocols, or the like. The devices may also be configured to operate in accordance with non-cellular communication mechanisms, such as via a wireless local area network (WLAN) or other communication/data networks.

The network interface may also include an application interface in order to allow a user or service provider to execute some or all of the above-described processes. The application interface may have access to the hardware, e.g., the transceiver, and software previously described with respect to the network interface. Furthermore, the application interface may have the ability to connect to and communicate with an external data storage on a separate system within the network.

The devices may have an interface that includes user output devices and/or input devices. The output devices may include a display (e.g., a liquid crystal display (LCD) or the like) and a speaker or other audio device, which are operatively coupled to the processing device. The input devices, which may allow the devices to receive data from a user, may include any of a number of devices allowing the devices to receive data from a user, such as a keypad, keyboard, touch-screen, touchpad, microphone, mouse, joystick, other pointer device, button, soft key, and/or other input device(s).

The devices may further include a power source. Generally, the power source is a device that supplies electrical energy to an electrical load. In some embodiment, power source may convert a form of energy such as solar energy, chemical energy, mechanical energy, or the like to electrical energy. Generally, the power source may be a battery, such as a lithium battery, a nickel-metal hydride battery, or the like, that is used for powering various circuits, e.g., the transceiver circuit, and other devices that are used to operate the devices. Alternatively, the power source may be a power adapter that can connect a power supply from a power outlet to the devices. In such embodiments, a power adapter may be classified as a power source "in" the devices.

As described above, the computing devices as shown in FIG. 1 may also include a memory device operatively coupled to the processing device. As used herein, "memory" may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the devices described herein.

The computing systems may further comprise a gyroscopic device. The positioning system, input device, and the gyroscopic device may be used in correlation to identify phases within a service term.

Each computing system may also have a control system for controlling the physical operation of the device. The control system may comprise one or more sensors for detecting operating conditions of the various mechanical and electrical systems that comprise the computing systems or of the environment in which the computing systems are used. The sensors may communicate with the processing device to provide feedback to the operating systems of the device. The control system may also comprise metering devices for measuring performance characteristics of the computing systems. The control system may also comprise controllers such as programmable logic controllers (PLC), proportional integral derivative controllers (PID) or other machine controllers. The computing systems may also comprise various electrical, mechanical, hydraulic, or other systems that perform various functions of the computing systems. These systems may comprise, for example, electrical circuits, motors, compressors, or any system that enables functioning of the computing systems.

Figure 2:
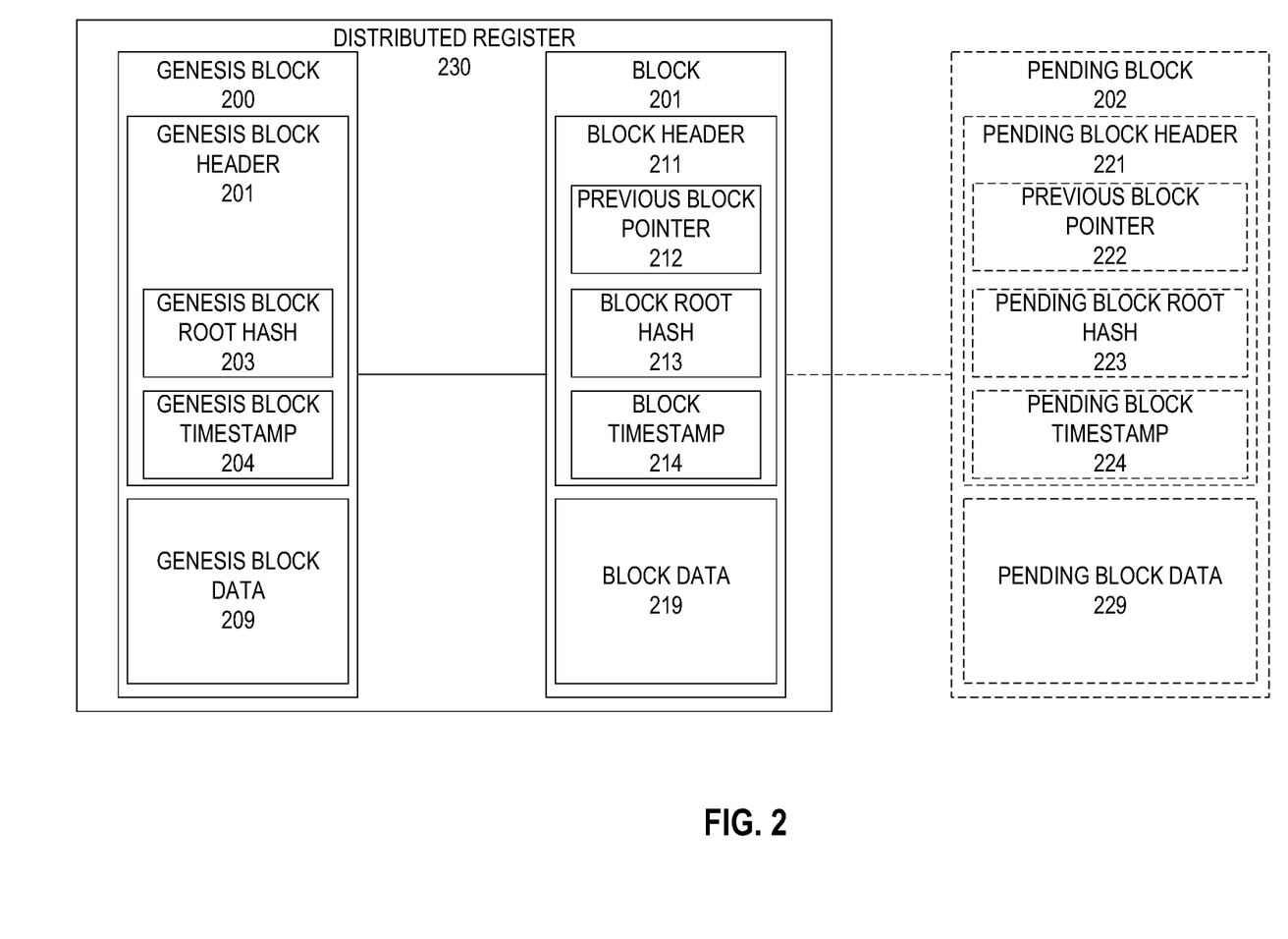
FIG. 2 is a block diagram illustrating the data structures within an exemplary distributed register, in accordance with one embodiment of the present disclosure.

FIG. 2 is a block diagram illustrating the data structures within an exemplary distributed register, in accordance with some embodiments. In particular, FIG. 2 depicts a plurality of blocks 200, 201 within the distributed register 230, in addition to a pending block 202 that has been submitted to be appended to the distributed register 230. The distributed register 230 may comprise a genesis block 200 that serves as the first block and origin for subsequent blocks in the distributed register 230. The genesis block 200, like all other blocks within the distributed register 230, comprise a block header 201 and block data 209. The genesis block data 209, or any other instances of block data within the distributed register 230 (or any other distributed register) may contain one or more data records. For instance, block data may comprise software source code, authentication data, transaction data, documents, or other data containers, third party information, regulatory and/or legal data, or the like.

The genesis block header 201 may comprise various types of metadata regarding the genesis block data 209. In some embodiments, the block header 201 may comprise a genesis block root hash 203, which is a hash derived from an algorithm using the genesis block data 209 as inputs. In some embodiments, the genesis block root hash 203 may be a Merkle root hash, wherein the genesis block root hash 203 is calculated via a hash algorithm based on a combination of the hashes of each data record within the genesis block data 209. In this way, any changes to the data within the genesis block data 209 will result in a change in the genesis block root hash 203. The genesis block header 201 may further comprise a genesis block timestamp 204 that indicates the time at which the block was written to the distributed register 230. In some embodiments, the timestamp may be a Unix timestamp. In some embodiments, particularly in ledgers utilizing a PoW consensus mechanism, the block header 201 may comprise a nonce value and a difficulty value. The nonce value may be a whole number value that, when combined with the other items of metadata within the block header 201 into a hash algorithm, produces a hash output that satisfies the difficulty level of the cryptographic puzzle as defined by the difficulty value. For instance, the consensus mechanism may require that the resulting hash of the block header 201 falls below a certain value threshold (e.g., the hash value must start with a certain number of zeroes, as defined by the difficulty value).

A subsequent block 201 may be appended to the genesis block 200 to serve as the next block in the linked block structure. Like all other blocks, the subsequent block 201 comprises a block header 211 and block data 219. Similarly, the block header 211 comprise a block root hash 213 of the data within the block data 219 and a block timestamp 214. The block header 211 may further comprise a previous block pointer 212, which may be a hash calculated by combining the hashes of the metadata (e.g., the genesis block root hash 203, genesis block timestamp 204, and the like) within the block header 201 of the genesis block 200. In this way, the block pointer 212 may be used to identify the previous block (e.g., the genesis block 200) in the distributed register 230, thereby creating a "chain" comprising the genesis block 200 and the subsequent block 201.

The value of a previous block pointer is dependent on the hashes of the block headers of all of the previous blocks in the chain; if the block data within any of the blocks is altered, the block header for the altered block as well as all subsequent blocks will result in different hash values. In other words, the hash in the block header may not match the hash of the values within the block data, which may cause subsequent validation checks to fail. Even if an unauthorized user were to change the block header hash to reflect the altered block data, this would in turn change the hash values of the previous block pointers of the next block in the sequence. Therefore, an unauthorized user who wishes to alter a data record within a particular block must also alter the hashes of all of the subsequent blocks in the chain in order for the altered copy of the ledger to pass the validation checks imposed by the consensus algorithm. Thus, the computational impracticability of altering data records in a ledger in turn greatly reduces the probability of improper alteration of data records.

A pending block 202 or "proposed block" may be submitted for addition to the distributed register 230. The pending block 202 may comprise a pending block header 221, which may comprise a pending block root hash 223, a previous block pointer 222 that points to the previous block 201, a pending block timestamp 224, and pending block data 229. Once a pending block 202 is submitted to the system, the nodes within the system may validate the pending block 202 via a consensus algorithm. The consensus algorithm may be, for instance, a proof of work mechanism, in which a node determines a nonce value that, when combined with a hash of the block header 211 of the last block in the linked block structure, produces a hash value that falls under a specified threshold value. For instance, the PoW algorithm may require that said hash value begins with a certain number of zeroes. Once said nonce value is determined by one of the nodes, the node may post the "solution" to the other nodes. Once the solution is validated by the other nodes, the hash of the block header 211 is included in the pending block header 221 of the pending block 202 as the previous block pointer 222. The pending block header 221 may further comprise the pending block root hash 223 of the pending block data 229 which may be calculated based on the winning solution. The pending block 202 is subsequently considered to be appended to the previous block 201 and becomes a part of the distributed register 230. A pending block timestamp 224 may also be added to signify the time at which the pending block 202 is added to the distributed register 230.

In other embodiments, the consensus mechanism may be based on a total number of consensus inputs submitted by the nodes of the distributed register 230, e.g., a PBFT consensus mechanism. Once a threshold number of consensus inputs to validate the pending block 202 has been reached, the pending block 202 may be appended to the distributed register 230. In such embodiments, nonce values and difficulty values may be absent from the block headers. In still other embodiments, the consensus algorithm may be a Proof-of-Stake mechanism in which the stake (e.g., amount of digital currency, reputation value, or the like) may influence the degree to which the node may participate in consensus and select the next proposed block. In other embodiments, the consensus algorithm may be a Proof-of-Authority mechanism in which the identity of the validator itself (with an attached reputation value) may be used to validate proposed data records (e.g., the ability to participate in consensus/approval of proposed data records may be limited to approved and/or authorized validator nodes). In yet other embodiments, the consensus algorithm may comprise a manual node approval process rather than an automated process.

Figure 3:
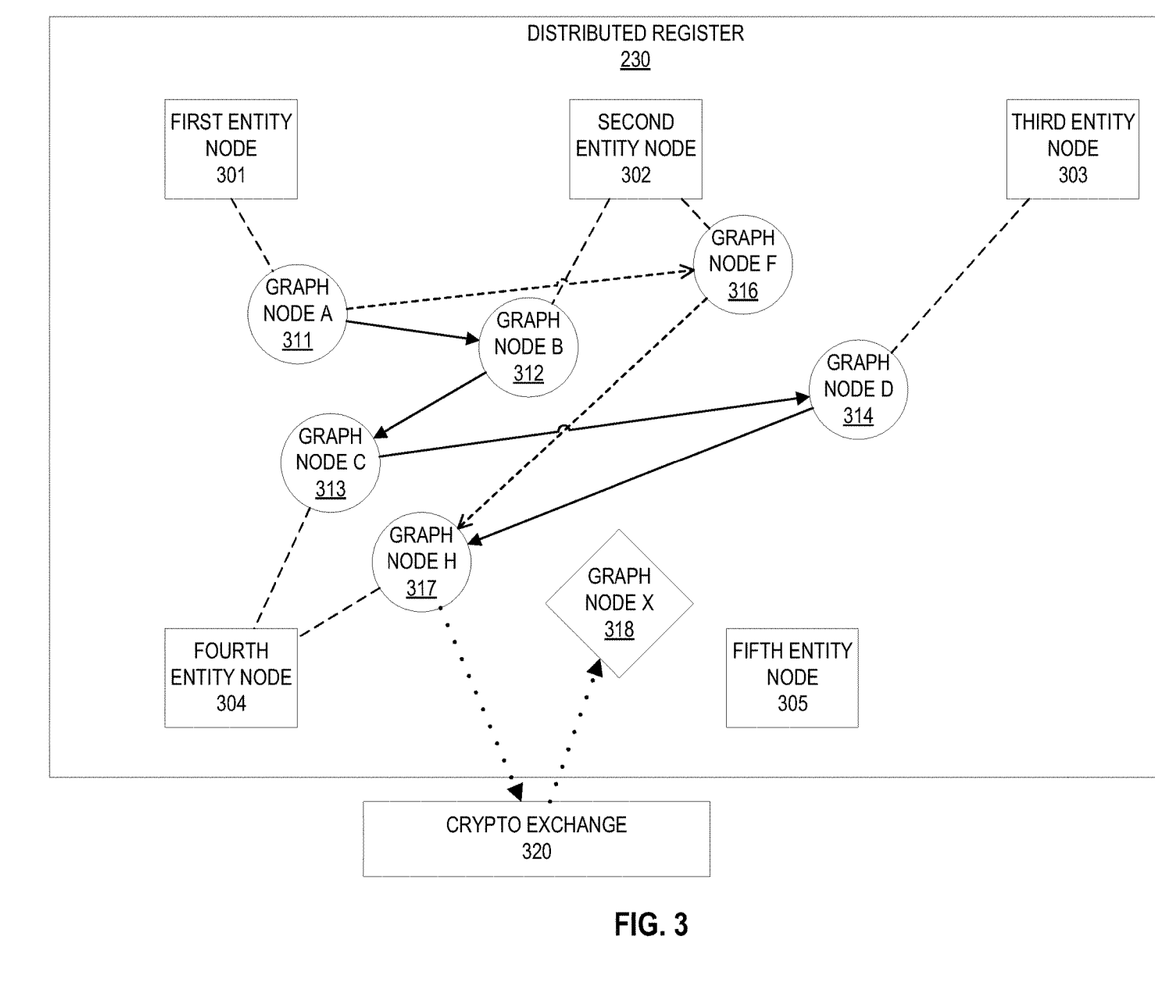
FIG. 3 is a block diagram illustrating a graph of the linkages that may be detected by the AI/ML engine using the data within the distributed register, in accordance with one embodiment of the present disclosure.

FIG. 3 is a block diagram illustrating a graph of the linkages that may be detected by the AI/ML engine using the data within the distributed register, in accordance with one embodiment of the present disclosure. In this regard, FIG. 3 illustrates a plurality of graph nodes 311, 312, 313, 314, 316, 317, 318, where each of the graph nodes have been identified by one or more of a plurality of entity nodes 301, 302, 303, 304, 305 as being a potentially unauthorized or suspicious user, account, and/or resource transfer. In an exemplary embodiment, as shown by the long dashed line, graph node A 311 may represent information (e.g., data regarding the potentially unauthorized user, potentially unauthorized resource transfers regarding the user, the geo-spatial data associated with the user and/or the resource transfers, time-frame data, and the like) submitted to the distributed register 230 by the first entity node. Similarly, the second entity node 302 may submit information regarding graph node B 312 and graph node F 316, the third entity node 303 may submit information regarding graph node D 314, and the fourth entity node 304 may submit information regarding graph node C 313 and graph node H 317.

The deep learning algorithm may use bipartite graph processing to generate links between the various graph nodes, thereby allowing the system to identify relationships between the potentially unauthorized users, accounts, and resource transfers, which may include deeply hidden users that may not be detected through ordinary AML processes. For instance, as denoted by the short dashed directional lines, the system may detect that resources are transferred from graph node A 311 to graph node B 312, then to graph node C 313, then to graph node D 314, then finally to graph node H 317. The path of resources from A to B to C to D to H may constitute a first layer of obfuscation that may be detected by the system. It should be appreciated that the various graph nodes may exist in different geo-spatial regions. Accordingly, the machine learning algorithm may detect geographic region-specific resource transfer patterns (e.g., unauthorized transfers tend to originate from and/or be transmitted to a specific geographic region) to create the linkages between the various graph nodes.

Similarly, the system may further detect that sources are transferred from graph node A 311 to graph node F 316, then to graph node H 317, which may be identified by the system as a second layer of obfuscation. In such a scenario, graph node H 317 may be identified as a beneficiary of the potentially unauthorized resource transfers. Furthermore, the AI/ML engine may identify one or more exchanges initiated by graph node H 317 at a crypto exchange 320 (e.g., to exchange resources between cryptocurrency and fiat currency), where the resources may then be subsequently transferred to graph node X 318 (as shown by the directional dotted lines). For example, graph node H 317 may change an amount of fiat currency to a cryptocurrency at the crypto exchange 320, which is then transferred to a wallet associated with graph node X 318. It should be noted that information regarding graph node X 318 has not been shared to the distributed register 230 by any of the entities (e.g., none of the entities' AML processes have detected the existence of graph node X 318). Accordingly, graph node X 318 may be considered to be a deeply hidden beneficiary of the unauthorized resources that has been uncovered by the AI/ML, engine.

Figure 4:
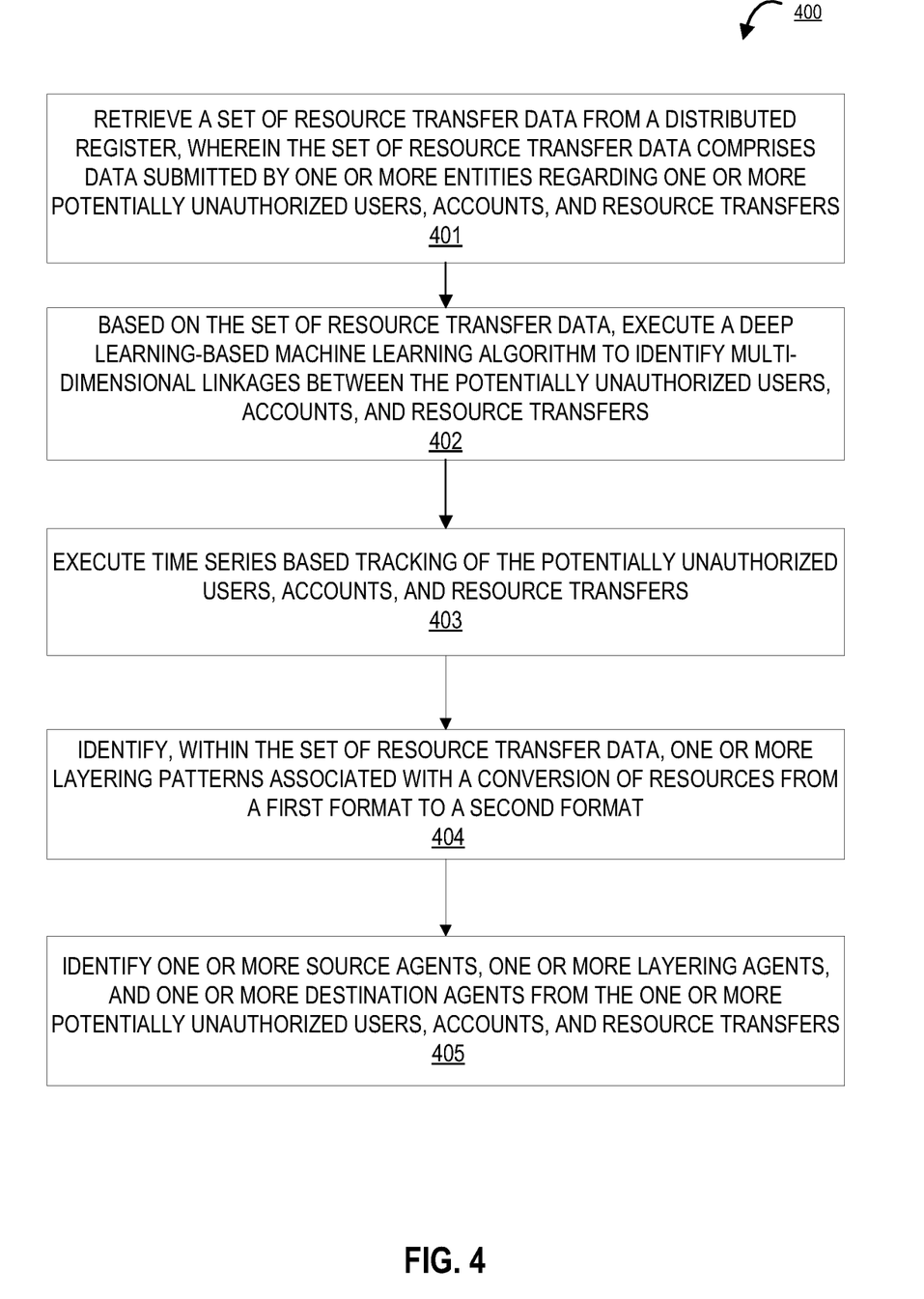
FIG. 4 is a flow diagram illustrating a process for detecting multi-dimensional linkage and layering of resource transfers using a distributed server network, in accordance with one embodiment of the present disclosure.

FIG. 4 is a flow diagram illustrating a process flow 400 for detecting multi-dimensional linkage and layering of resource transfers using a distributed server network, in accordance with one embodiment of the present disclosure. The process begins at block 401, where the system retrieves a set of resource transfer data from a distributed register, wherein the set of resource transfer data comprises data submitted by one or more entities regarding one or more potentially unauthorized users, accounts, and resource transfers. Each of the one or more entities may be, for instance, financial institutions that may identify the potentially unauthorized users, accounts, and resource transfers through its internal AML, processes. Accordingly, the set of resource transfer data may include information such as the identity of senders and/or recipients of resources, the amount of resources transferred, the type of resources transferred (e.g., fiat currencies vs. cryptocurrencies), sources of funds, the geo-spatial information regarding the resources transferred (e.g., the jurisdictional boundaries involved in the resource transfer), and the like. In some embodiments, the system may further pull international beneficiary data from one or more beneficiary databases (e.g., from the Internet).

The process continues to block 402, where the system, based on the set of resource transfer data, executes a deep learning-based machine learning algorithm to identify multi-dimensional linkages between the potentially unauthorized users, accounts, and resource transfers. In this regard, the system may use bipartite graph processing to generate one or more vertices, each of which may represent a potentially unauthorized user, account, or resource transfer. For instance, in embodiments in which the generated graph represents the potentially unauthorized users as vertices (e.g., a sender and a recipient), the relationships between the vertices may contain information such as the direction of the resource transfer, the amount and/or type of resource transferred, the geo-spatial information regarding where the resource transfer was executed, and the like.

The process continues to block 403, where the system executes time series based tracking of the potentially unauthorized users, accounts, and resource transfers. In this regard, the system may create data linkages between the data points in the set of resource transfer to detect the frequency and time period of the inflow and outflow of resources between users. In turn, the system may then use the AI/ML algorithm to perform pattern detection on the set of resource transfer data based on the frequency and time period of the inflow and outflow of resources.

The process continues to block 404, where the system identifies, within the set of resource transfer data, one or more layering patterns associated with a conversion of resources from a first format to a second format. For instance, the first format may be a set of resources in a fiat currency, whereas the second format may be the set of resources in a cryptocurrency. In this regard, the system may monitor outgoing resource transfers to a crypto exchange as well as incoming resource transfers to a recipient. Through the multi-factor pattern analysis, the system may generate a complete snapshot of unauthorized resource transfers, including hidden beneficiaries.

The process continues to block 405, where the system identifies one or more source agents, one or more layering agents, and one or more destination agents from the one or more potentially unauthorized users, accounts, and resource transfers. Based on the AI/ML process, the system may identify the key parties to the unauthorized resource transfers. In this regard, the source agents may be the source of the unauthorized resources, the layering agents may be the intermediaries that may create obfuscation patterns for the resource transfers, and the destination agent may be the hidden beneficiary of the unauthorized resource transfer (e.g., the destination agent was not included within the set of resource transfer data provided by the one or more entities). Accordingly, once the key parties have been identified, the system may identify a chain of resource transfers between the parties to be an unauthorized resource transfer process. The system may then generate a report identifying the one or more source agents, layering agents, and destination agents to be transmitted to a computing system (e.g., the system operated by an agent or administrator of the entity, or of a legal or regulatory agency). In this way, the system provides a secure and efficient way to identify the participants and patterns involved in unauthorized resource transfers.

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EEPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Embodiments of the present invention are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined, or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for detecting multi-dimensional linkage and layering of resource transfers using a distributed server network, the system comprising:
   a memory device with computer-readable program code stored thereon;
   a communication device; and
   a processing device operatively coupled to the memory device and the communication device, wherein the processing device is configured to execute the computer-readable program code to:
      retrieve a set of resource transfer data from a distributed register, wherein the set of resource transfer data comprises data submitted by one or more entities regarding potentially unauthorized users, accounts, and resource transfers;

based on the set of resource transfer data, execute a deep learning-based machine learning algorithm to identify multi-dimensional linkages between the potentially unauthorized users, accounts, and resource transfers, wherein identifying the multi-dimensional linkages comprises:
  detecting a resource transfer between a first potentially unauthorized user and a second potentially unauthorized user; and
  based on detecting the resource transfer, forming a multi-dimensional linkage between the first potentially unauthorized user and the second potentially unauthorized user, wherein the multi-dimensional linkage comprises information regarding a direction of the resource transfer, a resource type associated with the resource transfer, and geo-spatial information associated with the resource transfer;
execute time series based tracking of the potentially unauthorized users, accounts, and resource transfers;
identify, within the set of resource transfer data, one or more layering patterns associated with a conversion of resources from a first format to a second format; and
identify one or more source agents, one or more layering agents, and one or more destination agents from the one or more potentially unauthorized users, accounts, and resource transfers, wherein identifying the one or more destination agents comprises uncovering, using the machine learning algorithm, a hidden recipient of an unauthorized resource transfer, wherein the hidden recipient was not included in the set of resource transfer data.

2. The system according to claim 1, wherein executing the time series based tracking comprises:
  generating data linkages between data points in the set of resource transfer data to identify a frequency and a time period for the one or more potentially unauthorized users, accounts, and resource transfers; and
  based on the frequency and the time period, execute, using the deep learning-based machine learning algorithm, time-based pattern recognition on the one or more potentially unauthorized users, accounts, and resource transfers.

3. The system according to claim 1, wherein the set of resource transfer data further comprises geo-spatial data associated with the one or more potentially unauthorized users, accounts, and resource transfers, wherein identifying the multi-dimensional linkages further comprises generating data linkages between geographical regions associated with the one or more potentially unauthorized users, accounts, and resource transfers.

4. The system according to claim 1, wherein the processing device is further configured to execute the computer-readable program code to generate a graph database, wherein the one or more source agents, the one or more layering agents, and the one or more destination agents are stored as vertices in the graph database, wherein one or more associations between the one or more source agents, the one or more layering agents, and the one or more destination agents are stored as relationships in the graph database.

5. The system according to claim 1, wherein the deep learning-based machine learning algorithm uses bipartite graph processing.

6. The system according to claim 1, wherein the processing device is further configured to execute the computer-readable program code to:
  generate a report identifying the one or more source agents, the one or more layering agents, and the one or more destination agents; and
  transmit the report to a user computing system.

7. The system according to claim 1, wherein the processing device is further configured to execute the computer-readable program code to identify a chain of resource transfers between the one or more source agents, the one or more layering agents, and the one or more destination agents, wherein the chain of resource transfers is identified to be an unauthorized resource transfer process.

8. A computer program product for detecting multi-dimensional linkage and layering of resource transfers using a distributed server network, the computer program product comprising at least one non-transitory computer readable medium having computer-readable program code portions embodied therein, the computer-readable program code portions comprising executable portions for:
  retrieving a set of resource transfer data from a distributed register, wherein the set of resource transfer data comprises data submitted by one or more entities regarding potentially unauthorized users, accounts, and resource transfers;
  based on the set of resource transfer data, executing a deep learning-based machine learning algorithm to identify multi-dimensional linkages between the potentially unauthorized users, accounts, and resource transfers, wherein identifying the multi-dimensional linkages comprises:
    detecting a resource transfer between a first potentially unauthorized user and a second potentially unauthorized user; and
    based on detecting the resource transfer, forming a multi-dimensional linkage between the first potentially unauthorized user and the second potentially unauthorized user, wherein the multi-dimensional linkage comprises information regarding a direction of the resource transfer, a resource type associated with the resource transfer, and geo-spatial information associated with the resource transfer;
  executing time series based tracking of the potentially unauthorized users, accounts, and resource transfers;
  identifying, within the set of resource transfer data, one or more layering patterns associated with a conversion of resources from a first format to a second format; and
  identifying one or more source agents, one or more layering agents, and one or more destination agents from the one or more potentially unauthorized users, accounts, and resource transfers, wherein identifying the one or more destination agents comprises uncovering, using the machine learning algorithm, a hidden recipient of an unauthorized resource transfer, wherein the hidden recipient was not included in the set of resource transfer data.

9. The computer program product according to claim 8, wherein executing the time series based tracking comprises:
  generating data linkages between data points in the set of resource transfer data to identify a frequency and a time period for the one or more potentially unauthorized users, accounts, and resource transfers; and
  based on the frequency and the time period, execute, using the deep learning-based machine learning algorithm, time-based pattern recognition on the one or more potentially unauthorized users, accounts, and resource transfers.

10. The computer program product according to claim 8, wherein the set of resource transfer data further comprises geo-spatial data associated with the one or more potentially unauthorized users, accounts, and resource transfers, wherein identifying the multi-dimensional linkages further comprises generating data linkages between geographical regions associated with the one or more potentially unauthorized users, accounts, and resource transfers.

11. The computer program product according to claim 8, wherein the computer-readable program code portions further comprise executable portions for generating a graph database, wherein the one or more source agents, the one or more layering agents, and the one or more destination agents are stored as vertices in the graph database, wherein one or more associations between the one or more source agents, the one or more layering agents, and the one or more destination agents are stored as relationships in the graph database.

12. The computer program product according to claim 8, wherein the deep learning-based machine learning algorithm uses bipartite graph processing.

13. The computer program product according to claim 8, wherein the computer-readable program code portions further comprise executable portions for:
generating a report identifying the one or more source agents, the one or more layering agents, and the one or more destination agents; and
transmitting the report to a user computing system.

14. A computer-implemented method for detecting multi-dimensional linkage and layering of resource transfers using a distributed server network, the computer-implemented method comprising:
retrieving a set of resource transfer data from a distributed register, wherein the set of resource transfer data comprises data submitted by one or more entities regarding potentially unauthorized users, accounts, and resource transfers;
based on the set of resource transfer data, executing a deep learning-based machine learning algorithm to identify multi-dimensional linkages between the potentially unauthorized users, accounts, and resource transfers, wherein identifying the multi-dimensional linkages comprises:
detecting a resource transfer between a first potentially unauthorized user and a second potentially unauthorized user; and
based on detecting the resource transfer, forming a multi-dimensional linkage between the first potentially unauthorized user and the second potentially unauthorized user, wherein the multi-dimensional linkage comprises information regarding a direction of the resource transfer, a resource type associated with the resource transfer, and geo-spatial information associated with the resource transfer;
executing time series based tracking of the potentially unauthorized users, accounts, and resource transfers;
identifying, within the set of resource transfer data, one or more layering patterns associated with a conversion of resources from a first format to a second format; and
identifying one or more source agents, one or more layering agents, and one or more destination agents from the one or more potentially unauthorized users, accounts, and resource transfers, wherein identifying the one or more destination agents comprises uncovering, using the machine learning algorithm, a hidden recipient of an unauthorized resource transfer, wherein the hidden recipient was not included in the set of resource transfer data.

15. The computer-implemented method according to claim 14, wherein executing the time series based tracking comprises:
generating data linkages between data points in the set of resource transfer data to identify a frequency and a time period for the one or more potentially unauthorized users, accounts, and resource transfers; and
based on the frequency and the time period, execute, using the deep learning-based machine learning algorithm, time-based pattern recognition on the one or more potentially unauthorized users, accounts, and resource transfers.

16. The computer-implemented method according to claim 14, wherein the set of resource transfer data further comprises geo-spatial data associated with the one or more potentially unauthorized users, accounts, and resource transfers, wherein identifying the multi-dimensional linkages further comprises generating data linkages between geographical regions associated with the one or more potentially unauthorized users, accounts, and resource transfers.

17. The computer-implemented method according to claim 14, wherein the computer-implemented method further comprises generating a graph database, wherein the one or more source agents, the one or more layering agents, and the one or more destination agents are stored as vertices in the graph database, wherein one or more associations between the one or more source agents, the one or more layering agents, and the one or more destination agents are stored as relationships in the graph database.

18. The computer-implemented method according to claim 14, wherein the deep learning-based machine learning algorithm uses bipartite graph processing.

19. The computer-implemented method according to claim 14, wherein the computer-implemented method further comprises:
generating a report identifying the one or more source agents, the one or more layering agents, and the one or more destination agents; and
transmitting the report to a user computing system.

20. The computer-implemented method according to claim 14, wherein the computer-implemented method further comprises identifying a chain of resource transfers between the one or more source agents, the one or more layering agents, and the one or more destination agents, wherein the chain of resource transfers is identified to be an unauthorized resource transfer process.

\* \* \* \* \*